(12) United States Patent
Ghose

(10) Patent No.: US 8,782,434 B1
(45) Date of Patent: Jul. 15, 2014

(54) SYSTEM AND METHOD FOR VALIDATING PROGRAM EXECUTION AT RUN-TIME

(75) Inventor: Kanad Ghose, Vestal, NY (US)

(73) Assignee: The Research Foundation for the State University of New York, Binghamton, NY (US)

( * ) Notice: Subject to any disclaimer, the term of this patent is extended or adjusted under 35 U.S.C. 154(b) by 266 days.

(21) Appl. No.: 13/183,857

(22) Filed: Jul. 15, 2011

Related U.S. Application Data

(60) Provisional application No. 61/364,795, filed on Jul. 15, 2010.

(51) Int. Cl.
| | |
|---|---|
| *G06F 9/44* | (2006.01) |
| *G06F 9/38* | (2006.01) |
| *G06F 21/72* | (2013.01) |
| *G06F 21/54* | (2013.01) |
| *G06F 11/14* | (2006.01) |
| *G06F 11/36* | (2006.01) |

(52) U.S. Cl.
CPC ............ *G06F 9/3851* (2013.01); *G06F 9/3834* (2013.01); *G06F 21/72* (2013.01); *G06F 21/54* (2013.01); *G06F 11/1407* (2013.01); *G06F 11/3612* (2013.01)
USPC ........... 713/190; 713/189; 713/176; 711/118; 711/119; 711/146; 712/213; 712/214; 712/215; 712/216

(58) Field of Classification Search
CPC . G06F 11/1407; G06F 11/3612; G06F 21/52; G06F 21/54; G06F 21/72; G06F 21/74
USPC ........... 717/124; 711/152, 128; 712/213, 214, 712/216, 227; 713/189, 190, 176; 714/11
See application file for complete search history.

(56) References Cited

U.S. PATENT DOCUMENTS

| | | | |
|---|---|---|---|
| 5,944,821 | A | 8/1999 | Angelo |
| 6,070,239 | A | 5/2000 | McManis |
| 6,938,164 | B1 | 8/2005 | England et al. |
| 7,444,601 | B2 | 10/2008 | Proudler et al. |
| 7,490,250 | B2 | 2/2009 | Cromer et al. |
| 7,490,352 | B2 | 2/2009 | Kramer et al. |
| 7,571,312 | B2 | 8/2009 | Scarlata et al. |
| 7,590,869 | B2 | 9/2009 | Hashimoto |
| 7,603,707 | B2 | 10/2009 | Seifert et al. |

(Continued)

OTHER PUBLICATIONS

SETI@home. http://setiathome.ssl.berkeley.edu/.

(Continued)

*Primary Examiner* — Amare F Tabor
*Assistant Examiner* — Noura Zoubair
(74) *Attorney, Agent, or Firm* — Steven M. Hoffberg; Ostrolenk Faber LLP

(57) ABSTRACT

A pipelined processor comprising a cache memory system, fetching instructions for execution from a portion of said cache memory system, an instruction commencing processing before a digital signature of the cache line that contained the instruction is verified against a reference signature of the cache line, the verification being done at the point of decoding, dispatching, or committing execution of the instruction, the reference signature being stored in an encrypted form in the processor's memory, and the key for decrypting the said reference signature being stored in a secure storage location. The instruction processing proceeds when the two signatures exactly match and, where further instruction processing is suspended or processing modified on a mismatch of the two said signatures.

35 Claims, 4 Drawing Sheets

(56) References Cited

U.S. PATENT DOCUMENTS

| | | | |
|---|---|---|---|
| 7,694,139 | B2 | 4/2010 | Nachenberg et al. |
| 7,725,703 | B2 | 5/2010 | Hunter et al. |
| 7,730,312 | B2 | 6/2010 | Everett et al. |
| 7,734,921 | B2 | 6/2010 | Lotspiech |
| 7,739,517 | B2 | 6/2010 | Sahita et al. |
| 2008/0034350 | A1* | 2/2008 | Conti .................. 717/124 |
| 2008/0162889 | A1* | 7/2008 | Cascaval et al. ........... 712/216 |
| 2008/0215920 | A1 | 9/2008 | Mayer et al. |
| 2009/0217050 | A1 | 8/2009 | Amiel et al. |
| 2010/0281239 | A1* | 11/2010 | Sudhakar et al. ........... 712/222 |

OTHER PUBLICATIONS

TCPA. http://www.trustedcomputing.org/.

A. Carroll, M. Juarez, J. Polk, and T. Leininger Microsoft Palladium: A business overview, Aug. 2002. Microsoft Press Release.

B. Gassend, D. Clarke, M. Van Dijk, and S. Devadas. Controlled physical random functions. In Proceedings of the 18th Annual Computer Security Applications Conference, Dec. 2002.

D. Lie, C. A. Thekkath, M. Mitchell, P. Lincoln, D. Boneh, J. C. Mitchell, and M. Horowitz. Architectural support for copy and tamper resistant software. In Proceedings of Conference on Architectural Support for Programming Languages and Operating Systems (ASPLOS), pp. 168-177, 2000.

U. Maheshwari, R. Vingralek, and W. Shapiro. How to build a trusted database system on untrusted storage. In Proceedings of the 4th USENIX Symposium on Operating Systems Design and Implementation, pp. 135-150, Oct. 2000.

S. W. Smith and S.H. Weingart. Building a high performance, programmable secure coprocessor. In Computer Networks (Special Issue on Computer Network Security), vol. 31, pp. 831-860, Apr. 1999.

E. Suh, D. Clarke, B. Gassend, M. van Dijk, and S. Devadas. The AEGIS processor architecture for tamper evident and tamper resistant processing. Technical Report LCS-TM-461, Massachusetts Institute of Technology, Feb. 2003.

E. Suh, D. Clarke, B. Gassend, M. van Dijk, and S. Devadas. Hardware mechanisms for memory authentication. Technical Report LCS-TM-460, Massachusetts Institute of Technology, Feb. 2003.

S. Weingart. Physical security for the µABYSS system. In Proceedings of the IEEE Computer Society Conference on Security and Privacy, pp. 38-51, 1987.

S. White, S. Weingart, W. Arnold, and E. Palmer. Introduction to the Citadel architecture: security in physically exposed environments. Technical Report RC16672, IBM Thomas J. Watson Research Center, Mar. 1991.

B. Yee. Using secure coprocessors. PhD thesis, Carnegie Mellon University, May 1994.

* cited by examiner

SYSTEM AND METHOD FOR VALIDATING PROGRAM EXECUTION AT RUN-TIME

CROSS REFERENCE TO RELATED APPLICATIONS

The present application is a non-provisional application of, and claims benefit of priority from, U.S. Provisional Patent Application Ser. No. 61/364,795, filed Jul. 15, 2010, the entirety of which is expressly incorporated herein by reference.

FIELD OF THE INVENTION

The present invention relates to systems and methods for secure computing.

BACKGROUND OF THE INVENTION

Current computer systems are highly vulnerable to cyber attack. The number of attacks and the financial losses due to those attacks have risen exponentially. Despite significant investments, the situation continues to worsen; novel attacks appear with high frequency and employ increasingly sophisticated techniques. There are very few fundamental sources of the vulnerabilities exploited by cyber attackers. These attacks stem from the fact that current computer systems cannot enforce the intended semantics of their computations. In particular, they fail to systematically enforce: Memory safety, Type safety, The distinction between code and data, and Constraints on information flow and access. These properties are not systematically enforced today because they are not: Systematically captured during the design process; Formally analyzed or verified during design and implementation; Captured or enforced by common system programming languages (e.g., the C programming language); and Represented explicitly within the runtime environment of the system and therefore cannot be enforced dynamically by either hardware or software techniques.

DARPA (DARPA-BAA-10-70, Jun. 1, 2010) has therefore initiated the Clean-Slate Design of Resilient, Adaptive, Secure Hosts (CRASH) program. This program seeks designs for computing systems which are highly resistant to cyber-attack; can adapt after a successful attack in order to continue rendering useful services; can learn from previous attacks how to guard against and cope with future attacks; and can repair themselves after attacks have succeeded.

Current system software is large and complex. Hardware architectures provide mechanisms to protect the kernel from user code, but at the same time grant to the kernel unlimited privileges (at best, a few levels of increased privilege). Consequently, a single penetration into the kernel gives the attacker unlimited access. Since the cost of switching into kernel mode is high, there is a tendency for system programmers to move increasing amounts of functionality into the kernel, making it even less trustworthy and exposing an even larger attack surface. Likewise, programming flaws can result in unintended access to kernel or increased privilege level system access.

Current computer systems are not resilient to attacks. They lack the means to recover from attacks either by finding alternative methods for achieving their goals or by repairing the resources corrupted by the attack. They also typically lack the ability to diagnose the underlying problem and to fix the vulnerabilities that enabled the attack. Once a machine is corrupted, manual repairs by specialized personnel are required while the forensic information necessary to affect the repair is typically lacking. Finally, today's computer systems are nearly identical to one another, do not change appreciably over time, and share common vulnerabilities. A single network-based attack can therefore spread rapidly and affect a very large number of computers.

"Trusted Platform Module" is the name of a published specification detailing a secure cryptoprocessor that can store cryptographic keys that protect information, as well as the general name of implementations of that specification, often called the "TPM chip". The TPM specification is the work of the Trusted Computing Group. The current version of the TPM specification is 1.2 Revision 103, published on Jul. 9, 2007.

The Trusted Platform Module offers facilities for the secure generation of cryptographic keys, and limitation of their use, in addition to a hardware pseudo-random number generator. It also includes capabilities such as remote attestation and sealed storage. "Remote attestation" creates a nearly unforgeable hash key summary of the hardware and software configuration. The extent of the summary of the software is decided by the program encrypting the data. This allows a third party to verify that the software has not been changed. "Binding" encrypts data using the TPM endorsement key, a unique RSA key burned into the chip during its production, or another trusted key descended from it.[3] "Sealing" encrypts data similar to binding, but in addition specifies a state in which the TPM must be in order for the data to be decrypted (unsealed).

A Trusted Platform Module can be used to authenticate hardware devices. Since each TPM chip has a unique and secret RSA key burned in as it is produced, it is capable of performing platform authentication. For example, it can be used to verify that a system seeking access is the expected system.

The Trusted Platform Module is typically part of the supporting chipset for a processor system, and thus its use typically delays execution of instructions by the processor until verification is completed. Likewise, verification occurs with respect to instructions before they are cached by the processor. Thus, while the TMP provides secure data processing, it does not address insecurities in moving instructions to the processor, and is susceptible to instruction injection type attaches, and likewise introduces significant latencies.

Generally, pushing the security down to the hardware level in conjunction with software provides more protection than a software-only solution that is more easily compromised by an attacker. However even where a TPM is used, a key is still vulnerable while a software application that has obtained it from the TPM is using it to perform encryption/decryption operations, as has been illustrated in the case of a cold boot attack.

The "Cerium" technology (Chen and Morris, "Certifying Program Execution with Secure Processors", Proceedings of the 9th conference on Hot Topics in Operating Systems, USENIX, Volume 9, Pages: 133-138, 2003), expressly incorporated herein by reference, proposes a secure processor technology which validates cache line signature before commencement of processing. It provides a separate security co-processor, which is not integrated into main processing pipeline. Cerium computes signatures of the system software as it boots up, and uses these signatures to enforce copy protection. The software at each stage self checks its integrity against a reference signature stored in the co-processor's non-volatile memory. Each stage also authenticates the software for the next stage. Cerium assumes the existence and use of a cache where operating system and trusted code can be kept. See, also, Cliff Wang, *Malware Detection*, Advances in information security, Mihai Christodorescu, Somesh Jha, Douglas Maughan, Dawn Song, Cliff Wang, Editors, Springer, 2006.

Boneh et al., "Hardware Support for Tamper-Resistant and Copy-Resistant Software", Technical Report: CS-TN-00-97, (Stanford University, 2000), expressly incorporated herein by reference, provides a description of a hardware prototype which supports software-only taper resistant computing, with an atomic decrypt-and-execute operation.

U.S. Pat. No. 7,730,312, expressly incorporated herein by reference, provides a tamper resistant module certification authority. Software applications may be securely loaded onto a tamper resistant module (TRM) and securely deleted from the TRM. A method for determining, based at least upon an encrypted personalization data block, whether a TRM is part of a qualified set of TRM's to accept loading of an application is also provided. Thereafter, the method provides for loading the application onto the TRM only after the first step determines that the TRM is qualified to accept the loading of the application. A method is also provided for determining, based at least upon an encrypted personalization data block, whether a TRM is part of a qualified set of TRM's to accept deleting of an application. Thereafter, the method provides for deleting the application from the TRM only when the first step determines that the TRM is qualified to accept the deleting of the application.

U.S. Pat. No. 7,590,869, expressly incorporated herein by reference, provides an on-chip multicore type tamper resistant microprocessor, which has a feature that, on the microprocessor package which has a plurality of instruction execution cores on an identical package and an ciphering processing function that can use a plurality of ciphering keys in correspondence to programs under a multi-task program execution environment, a key table for storing ciphering keys and the ciphering processing function are concentrated on a single location on the package, such that it is possible to provide a tamper resistant microprocessor in the multi-processor configuration that can realize the improved processing performance by hardware of a given size compared with the case of providing the key table and the ciphering processing function distributedly.

U.S. Pat. No. 7,739,517, expressly incorporated herein by reference, provides a secure hardware device which compares code image with a known good code image, using a co-processor separate from the processor, which halts execution of code until it is verified. Reference code or its signature is stored in secure, separate storage, but is not itself encrypted. The separate co-processor is not integrated into main processing pipeline to avoid significant delays.

U.S. Pat. No. 7,734,921, expressly incorporated herein by reference, provides a system and method for guaranteeing software integrity via combined hardware and software authentication. The system enables individual user devices to authenticate and validate a digital message sent by a distribution center, without requiring transmissions to the distribution center. The center transmits the message with an appended modulus that is the product of two specially selected primes. The transmission also includes an appended authentication value that is based on an original message hash value, a new message hash value, and the modulus. The new message hash value is designed to be the center's public RSA key; a corresponding private RSA key is also computed. Individual user devices combine a digital signet, a public modulus, preferably unique hardware-based numbers, and an original message hash to compute a unique integrity value K. Subsequent messages are similarly processed to determine new integrity values K', which equal K if and only if new messages originated from the center and have not been corrupted.

U.S. Pat. No. 7,725,703, expressly incorporated herein by reference, provides Systems and methods for securely booting a computer with a trusted processing module (TPM). In a computer with a TPM, an expected hash value of a boot component may be placed into a platform configuration register (PCR), which allows a TPM to unseal a secret. The secret may then be used to decrypt the boot component. The hash of the decrypted boot component may then be calculated and the result can be placed in a PCR. The PCRs may then be compared. If they do not, access to the an important secret for system operation can be revoked. Also, a first secret may be accessible only when a first plurality of PCR values are extant, while a second secret is accessible only after one or more of the first plurality of PCR values has been replaced with a new value, thereby necessarily revoking further access to the first secret in order to grant access to the second secret.

U.S. Pat. No. 7,694,139, expressly incorporated herein by reference, provides a TPM for securing executable content. A software development system (SDS) executes on a computer having a TPM, and digitally signs software. The platform includes protected areas that store data and cannot be accessed by unauthorized modules. A code signing module executing in a protected area obtains a private/public key pair and a corresponding digital certificate. The SDS is configured to automatically and transparently utilize the code signing module to sign software produced by the system. End-user systems receive the certificate with the software and can use it to verify the signature. This verification will fail if a parasitic virus or other malicious code has altered the software.

U.S. Pat. No. 7,603,707, expressly incorporated herein by reference, provides a Tamper-aware virtual TPM, in which respective threads comprising a virtual TPM thread and a security-patrol threads are executed on a host processor. The host processor may be a multi-threaded processor having multiple logical processors, and the respective threads are executed on different logical processors. While the virtual TPM thread is used to perform various TPM functions, the security-patrol thread monitors for physical attacks on the processor by implementing various numerical calculation loops, wherein an erroneous calculation is indicative of a physical attack. In response to detection of such an attack, various actions can be taken in view of one or more predefined security policies, such as logging the event, shutting down the platform and/or informing a remote management entity.

U.S. Pat. No. 7,571,312, expressly incorporated herein by reference, provides methods and apparatus for generating endorsement credentials for software-based security coprocessors. A virtual manufacturer authority is launched in a protected portion of a processing system. A key for the virtual manufacturer authority is created. The key is protected by a security coprocessor of the processing system, such as a TPM. Also, the key is bound to a current state of the virtual manufacturer authority. A virtual security coprocessor is created in the processing system. A delegation request is transmitted from the processing system to an external processing system, such as a certificate authority (CA). After transmission of the delegation request, the key is used to attest to trustworthiness of the virtual security coprocessor.

U.S. Pat. No. 7,490,352, expressly incorporated herein by reference, provides systems and methods for verifying trust or integrity of executable files. The system determines that an executable file is being introduced into a path of execution, and then automatically evaluates it in view of multiple malware checks to detect if the executable file represents a type of malware. The multiple malware checks are integrated into an operating system trust verification process along the path of execution.

U.S. Pat. No. 7,490,250, expressly incorporated herein by reference, provides a system and method for detecting a tamper event in a trusted computing environment. The computer system has an embedded security system (ESS), a trusted operating system. A tamper signal is received and locked in the ESS. The trusted operating system is capable of detecting the tamper signal in the ESS.

U.S. Pat. No. 7,444,601, expressly incorporated herein by reference, provides a trusted computing platform, in which a trusted hardware device is added to the motherboard, and is configured to acquire an integrity metric, for example a hash of the BIOS memory of the computing platform. The trusted hardware device is tamper-resistant, difficult to forge and inaccessible to other functions of the platform. The hash can be used to convince users that that the operation of the platform (hardware or software) has not been subverted in some way, and is safe to interact with in local or remote applications. The main processing unit of the computing platform is directed to address the trusted hardware device, in advance of the BIOS memory, after release from 'reset'. The trusted hardware device is configured to receive memory read signals from the main processing unit and, in response, return instructions, in the native language of the main processing unit, that instruct the main processing unit to establish the hash and return the value to be stored by the trusted hardware device. Since the hash is calculated in advance of any other system operations, this is a relatively strong method of verifying the integrity of the system. Once the hash has been returned, the final instruction calls the BIOS program and the system boot procedure continues as normal. Whenever a user wishes to interact with the computing platform, he first requests the integrity metric, which he compares with an authentic integrity metric that was measured by a trusted party. If the metrics are the same, the platform is verified and interactions can continue. Otherwise, interaction halts on the basis that the operation of the platform may have been subverted.

U.S. Pat. No. 6,938,164, expressly incorporated herein by reference, provides a system and method for allowing code to be securely initialized in a computer. A memory controller prevents CPUs and other I/O bus masters from accessing memory during a code (for example, trusted core) initialization process. The memory controller resets CPUs in the computer and allows a CPU to begin accessing memory at a particular location (identified to the CPU by the memory controller). Once an initialization process has been executed by that CPU, the code is operational and any other CPUs are allowed to access memory (after being reset), as are any other bus masters (subject to any controls imposed by the initiated code).

U.S. Pat. No. 6,070,239, expressly incorporated herein by reference, provides a system and method for executing verifiable programs with facility for using non-verifiable programs from trusted sources. The system has a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source. Verifiable architecture neutral programs are Java bytecode programs whose integrity is verified using a Java bytecode program verifier. The non-verifiable programs are generally architecture specific compiled programs generated with the assistance of a compiler. Each architecture specific program typically includes two signatures, including one by the compiling party and one by the compiler. Each digital signature includes a signing party identifier and an encrypted message. The encrypted message includes a message generated by a predefined procedure, and is encrypted using a private encryption key associated with the signing party. A digital signature verifier used by the class loader includes logic for processing each digital signature by obtaining a public key associated with the signing party, decrypting the encrypted message of the digital signature with that public key so as generate a decrypted message, generating a test message by executing the predefined procedure on the architecture specific program associated with the digital signature, comparing the test message with the decrypted message, and issuing a failure signal if the decrypted message digest and test message digest do not match.

U.S. Pat. No. 5,944,821, expressly incorporated herein by reference, provides a secure software registration and integrity assessment in a computer system. The method provides secure registration and integrity assessment of software in a computer system. A secure hash table is created containing a list of secure programs that the user wants to validate prior to execution. The table contains a secure hash value (i.e., a value generated by modification detection code) for each of these programs as originally installed on the computer system. This hash table is stored in protected memory that can only be accessed when the computer system is in system management mode. Following an attempt to execute a secured program, a system management interrupt is generated. An SMI handler then generates a current hash value for the program to be executed. In the event that the current hash value matches the stored hash value, the integrity of the program is guaranteed and it is loaded into memory and executed. If the two values do not match, the user is alerted to the discrepancy and may be given the option to update or override the stored hash value by entering an administrative password.

U.S. 2008/0215920, expressly incorporated herein by reference, provides a processor which generates a signature value indicating a sequence of executed instructions, and the signature value is compared to signature values calculated for two or more possible sequences of executed instructions to determine which instruction sequence was executed. The signature is generated via a signature generator during program execution, and is provided external to the processor via a signature message. There is, in this system, no encryption of a stored signature, nor use of a secret key. The trace message storage unit is operable to store instruction pointer trace messages and executed instruction signature messages. The trace message storage unit is also operable to store messages in at least one of an on-chip or an off-chip trace memory. The executed instruction signature unit is operable to generate a cache line content signature. The signature may be generated via a signature generator during program execution, and provided external to the processor via a signature message such as by using a trace memory or buffer and a tool scan port.

FIG. 1 (of U.S. Patent Application 2008/0215920) (prior art) is a block diagram of a computer system, as may be used to practice various embodiments of the invention. A computer system 100 is in some embodiments a general-purpose computer, such as the personal computer that has become a common tool in business and in homes. In other embodiments, the computer 100 is a special purpose computer system, such as an industrial process control computer, a car computer, a communication device, or a home entertainment device. The computer comprises a processor 101, which is operable to execute software instructions to perform various functions.

The memory 102 and processor 101 in further embodiments include a smaller, faster cache memory which is used to store data that is recently used, or that is believed likely to be used in the near future. The software instructions and other data are stored in a memory 102 when the computer is in operation, and the memory is coupled to the processor by a bus 103. When the computer starts, data stored in nonvolatile storage such as a hard disk drive 104 or in other nonvolatile storage such as flash memory is loaded into the memory 102 for the processor's use.

In many general purpose computers, an operating system is loaded from the hard disk drive 104 into memory and is executed in the processor when the computer first starts, providing a computer user with an interface to the computer so that other programs can be run and other tasks performed. The operating system and other executing software are typically stored in nonvolatile storage when the computer is turned off, but are loaded into memory before the program instructions can be executed. Because memory 102 is significantly more expensive than most practical forms of nonvolatile storage, the hard disk drive or other nonvolatile storage in a computerized system often stores much more program data than can be loaded into the memory 102 at any given time. The result is that only some of the program data stored in nonvolatile memory for an executing program, operating system, or for other programs stored in nonvolatile memory can be loaded into memory at any one time. This often results in swapping pieces of program code into and out of memory 102 from the nonvolatile storage 104 during program execution, to make efficient use of the limited memory that is available.

Many modern computer systems use methods such as virtual memory addresses that are mapped to physical memory addresses and paged memory to manage the limited available physical memory 102. Virtual memory allows use of a larger number of memory address locations than are actually available in a physical memory 102, and relies on a memory management method to map virtual addresses to physical memory addresses as well as to ensure that the needed data is loaded into the physical memory. Needed data is swapped into and out of physical memory as needed by loading memory in pages, which are simply large segments of addressable memory that are moved together as a group. Memory management units within the processor or chipset architecture can also change the contents of memory or cache during program execution, such as where new data is needed in memory or is predicted to be needed and the memory or cache is already full.

An executing program may complete execution of all the needed program instructions in a particular page loaded into memory, and proceed to execute more instructions stored in another page. In a typical example, the previously executing page is swapped out of memory and the page containing the newly needed program code is loaded into memory in its place, enabling the processor to continue to execute program instructions from memory. This not only complicates memory management, but complicates debugging executing software as the program code stored in any particular physical memory location might be from any number of different pages with different virtual addresses. Further, program code loaded into memory need not be stored in the same physical memory location every time, and the actual physical address into which a program instruction is stored is not necessarily unique.

When tracing a program, the instruction flow is typically recorded according to the virtual addresses of the executed instructions. An example computer system block diagram is shown in FIG. 2 (of U.S. Patent Application 2008/0215920) (prior art), as may be used to practice some embodiments of the invention. Program code and other data is stored in storage 201, and are not directly associated with specific locations in system memory. The program code is loaded as needed by dynamic memory controller 202, which in various embodiments is an operating system task, a hardware memory controller, or another memory controller. Instructions are loaded as needed into instruction memory 203, which is in various embodiments any volatile or nonvolatile memory that is directly addressable by the processor. The instructions are provided to the processor for execution as shown at 204, and an instruction pointer referencing the currently executed program opcode is incremented at 205. If a branch or jump instruction is executed, the instruction pointer is not simply incremented but is changed to reflect the address of the branch or jump destination instruction. The instruction pointer address data is used to fetch the next instruction from memory as shown at 206, using physical or virtual addressing in various embodiments.

When using physical addresses, the memory management unit 207 need not be present, and the physical address referenced in the instruction pointer can be directly used to retrieve the next instruction from memory. When using virtual addressing, the MMU shown at 207 includes lookup tables built in communication with the dynamic memory controller 202 to convert the virtual address into a physical address. If the virtually addressed data is not physically stored in memory 203, it is loaded into physical memory and its physical memory location is associated with its virtual address in a process known as virtual memory management. In examples where the instruction pointer uses physical addresses, the execution unit 208 passes physical addresses for the executed instructions to a program trace module 209. When virtual addresses are used, the program trace unit receives the virtual address data. In either case, it can be difficult to later determine which program instructions from storage 201 were present in the virtual or physical address locations recorded, such as when a program has completed execution or has reached a breakpoint in the debugging process.

Breakpoints are often used to interrupt program execution at a predetermined point, at which the state of various data can be observed to determine what has happened up to that point in the program. Breakpoints are sometimes set by including them in the high-level language program, and are sometimes implemented as a comparator that looks for a specific instruction at a specific address that stops execution as a result of an address match. But, because the address is not necessarily unique to a particular program instruction, false breaks in program execution can occur before the desired breakpoint is reached when using such methods. Simply detecting false address matches can be performed by halting program execution and comparing the program content from memory to the various pages or memory contents that might possibly be located in that physical memory space. If the last instruction address's content matches the expected program code, the correct program code has been found. If the contents of the last executed address do not match the expected program code, then an exception (or false breakpoint) has been found. This solution is inconvenient if the program is relatively long, as several false program halts can occur before the desired breakpoint is reached. It remains problematic in applications where the program can't be stopped in certain points, such as in the engine control and industrial process control examples discussed earlier.

Another solution is to track loading various blocks of data into the memory, such as by tracing or recording the content of a specific marker location within the various pages or blocks that are swapped into and out of physical memory. This approach becomes impractical when relatively large numbers of pages are swapped in and out of memory, or when the size of data blocks swapped in and out of memory is relatively small. It is also problematic in that it requires additional logic and synchronization to track loading data into memory, particularly if the data is not loaded by the processor but is loaded by a direct memory access (DMA) controller or another such component.

U.S. Patent Application 2008/0215920 proposes identify the code actually executed during program execution. Although simply recording all instructions executed in order would reveal what code is actually executing, recording all executed instructions would require an undesirably large amount of storage space and is not a practical solution. The code is identified instead by use of a signature derived from the code, such as a hash value, a cyclic redundancy code (CRC), or an exclusive-or signature of the sequence of instructions that are actually executed. The length of the signature is selected to be sufficiently large that the odds of two different possible sequences of program instructions having the same signature is sufficiently low that it is not problematic. For example, a register in a processor is set to a zero value before the first instruction in a sequence of code is executed, and each executed instruction is XORed with the value of the register. The resulting value of the register when program execution is halted is therefore very likely unique to the particular sequence of instructions that were executed, enabling the programmer to calculate the signature of various possible code sequences and compare the signatures of the possible code sequences to the signature stored in the register to confirm a specific sequence of instructions. The programmer can therefore confirm the instruction sequence executed up to the point at which the break occurred.

The signature calculation may be restarted whenever a branch is taken, and the running value of the XOR signature value is recorded in a trace file after a certain number of instructions have been executed, such as every 16 instructions. The signature calculation may also be restarted on jump or branch instructions, such that the signature reflects the code sequence since the last jump or branch. In another example, crossing an address boundary triggers a restart in signature calculation, such that when the executed program code address changes from one block or page of memory to another, the signature counting restarts. The signature cal also be calculated at any time, even after program halted. The program instructions may execute continuously, with a buffer holding the last four instructions, or a compressed version of the last four instructions executed, such as an 8-bit value derived from each of the last four instructions executed. These instructions are made available to the programmer such as by storing them in a special trace hardware register or by making the instructions available externally so that they can be buffered outside the processor. The signature identifying the program code then comprises the last four instructions executed, or some value derived from the last four instructions such as a signature value derived from XORing the last four instructions or their 8-bit derived values together. This signature can then be compared with the signatures of the possible code sequences that may have been stored in the memory and executed just before program halt.

FIG. 3 (of U.S. Patent Application 2008/0215920) (prior art), is a block diagram of a processor architecture supporting program trace functionality including executed program code signatures. A processor core 301 is operable to execute software instructions, such as are retrieved from memory 102 of FIG. 1 or from cache memory. The presently executing instruction is referenced by an instruction pointer or a program counter, which indicates the address of the currently pending instruction and is incremented as instructions are executed. The instruction pointer is also changed to reflect branch or jump points in the instruction flow. The instruction pointer's indicated address is traced and compressed for storage as part of a program trace record at 302, and the instruction pointer information is formed into a message via a message generator 303. The messages contain the instruction pointer information compressed at 302, and are eventually stored in a log that can be examined after program execution to determine which instructions have executed during the program execution. Compression of the instruction flow is often very beneficial, as the volume of instructions executed can be much larger than the memory available for storing trace information. In one example, instruction pointer messages are compressed by identifying starting instruction addresses and the addresses of the instructions taken at branches or jumps, but not necessarily every intermediate instruction if no branches or jumps are present in the code. In another example, the trace messages are compressed by compressing the address values of the instructions.

A signature generator 304 receives the processor instructions being executed and generates a signature, such as by starting with a zero value and exclusive-ORing the executed instructions to a running signature value. In other embodiments, the signature is derived from a portion of the executing instruction, such as the last eight bits of each instruction, or comprises some other signature calculation method. A variety of hash functions, error correction and checksum functions, and other mathematical or logical functions will be suitable for signature generation, and will allow a debugger to determine which instructions have been executed. The signature data is sent to a signature message generator 305, which takes the signature data from the signature generator logic 304 and periodically formats it into a message that is suitable for storage as part of a program execution trace record. The signature message generator in some embodiments generates a message periodically, such as every 16 instructions, or uses other message generation criteria in other embodiments to trigger generation of a message. The signature message generator may also wait for a specified number of instructions before creating a first signature message, so that the signature value is very likely unique.

Both the signature messages from the signature message generator 305 and the instruction pointer trace unit messages from message generator 303 are forwarded to the message sorter 306, which organizes the message in a standardized readable format. Once the messages are sorted and organized, they are stored in the on-chip trace memory at 307, or are exported via a trace pin interface for storage external to the processor. The stored messages therefore contain instruction address data as well as signature data, so that the addresses of executed instructions can be seen via the instruction address messages and the actual instruction flow can be confirmed via the signature message data. The signature generator 304 may include additional data, such as a separate signature indicating the cache line from which the current instructions are executed. This signature in some embodiments is formed via a similar method such as a hash value calculation or exclusive OR logical function, or in alternate embodiments is formed using other methods such as by using an error correction code word (ECC) of the cache line, and is the result of the cache line from which executing instructions have been retrieved. The signature stays the same as long as execution continues from within the same cache line, but changes when a new cache line is used. The cache line signature in further embodiments is reset periodically, such as at jumps or braches in program flow, similar to the processor instruction signature.

US 2009/0217050, expressly incorporated herein by reference, provides systems and methods to optimize signature verification time for a cryptographic cache. Time is reduced by eliminating at least some of the duplicative application of cryptographic primitives. In some embodiments, systems and methods for signature verification comprise obtaining a signature which was previously generated using an asymmetrical cryptographic scheme, and determining whether an identical signature has previously been stored in a signature cache. If an identical signature has been previously stored in the signature cache, retrieving previously generated results corresponding to the previously stored identical signature, the results a consequence of application of cryptographic primitives of the asymmetrical cryptographic scheme corresponding to the identical signature. The results are forwarded to a signature verifier. In at least some embodiments, at least one of these functions occurs in a secure execution environment. Examples of a secure execution environment, without limitation, include an ARM TRUSTZONE® architecture, a trusted platform module (TPM), Texas Instruments' M-SHIELD™ security technology, etc. Secure execution environment comprises signature cache and at least a portion of security logic. Security logic in turn comprises signature look-up, calculator, hash function and signature verifier, although it should be readily apparent that more or different functions and modules may form part of security for some embodiments. The device obtains the signature (and message) from unsecure environment and promptly presents them to security logic for vetting. Embodiments employ signature look-up to check signature cache to determine whether the specific signature has been presented before. If the specific signature has indeed been previously presented, signature look-up retrieves the corresponding results of the previous utilization of cryptographic primitives corresponding to the relevant digital signature scheme being employed, which results were previously stored at the identified location in signature cache, and forwards the results to signature verifier. Among those results is the hash value of the previous message that is part of the previous signature. Signature verifier calls hash function to perform a hash on newly obtained message, and compares the hash value of the newly obtained message with the hash value retrieved from signature cache. If there is a match, the signature is verified and the message is forwarded for further processing, e.g., uploading into NVM or RAM as the case may be, etc. Thus, execution is commenced after verification.

Vivek Haldar, Deepak Chandra and Michael Franz, "Semantic Remote Attestation—A Virtual Machine directed approach to Trusted Computing", USENIX Virtual Machine Research and Technology Symposium, May 2004, provides a method for using language-based virtual machines which enables the remote attestation of complex, dynamic, and high-level program properties, in a platform-independent way.

Joshua N. Edmison, "Hardware Architectures for Software Security", Ph.D Thesis, Virginia Polytechnic Institute and State University (2006), proposes that substantial, hardware-based software protection can be achieved, without trusting software or redesigning the processor, by augmenting existing processors with security management hardware placed outside of the processor boundary. Benefits of this approach include the ability to add security features to nearly any processor, update security features without redesigning the processor, and provide maximum transparency to the software development and distribution processes.

Bryan Parno Jonathan M. McCune Adrian Perrig, "Bootstrapping Trust in Commodity Computers", IEEE Symposium on Security and Privacy, May 2010, provides a method for providing information about a computer's state, as part of an investigation of trustworthy computing.

SUMMARY OF THE INVENTION

According to a preferred embodiment of invention, the authenticity of instructions in a processor cache is verified within the processor, concurrent with initial execution of the instructions, and instruction processing is not delayed while a reference signature is accessed and is being verified. Thus, the verification proceeds in parallel with instruction execution. Advantageously, the execution pipeline for instructions is longer than the verification latency, so that in the event of a verification exception, instruction execution can be modified or preempted.

This differs from prior systems, e.g., Cerium, which provides strictly sequential order of operations, verification followed by initiation of processing of the instructions. Cerium thus does not lend itself to modern pipelined design, while the preferred embodiment of the present invention exploits modern processor architectures, permitting initial stages of program execution to speculatively execute, with a contingent subsequent exception or flushing occurring dependent on the verification status. If the code passes the verification, there is little or no delay in processing; if the verification fails, the pipeline is purged or other exception taken, thus providing the desired security.

In some embodiments, the verification need not merely flush the instruction pipeline, but in fact can provide a modification of instruction processing (similar to a vectored interrupt), such that the signature verification process can result in alternate execution results and/or pathways, rather than a simple go/nogo option for commitment of execution of an instruction.

In accordance with one embodiment, the verification employs preexisting speculative execution logic of a pipelined processor, in which the verification flag takes the place of a more traditional branch flag. Alternately, logic generally corresponding to, but distinct from, preexisting conditional execution logic may be employed. In the former case, the cache line verification logic is provided as a separate module, which, for example, completes verification within about 8 clock cycles, while the processor instruction decode and execution pipeline executes within about 20 clock cycles. Therefore, since the verification will generally be available before the end of the instruction pipeline, the processor can be better optimized to deal with verification exceptions.

In case of a verification exception, a typical response will be a flushing of the processor instruction decode and execution pipeline, along with a flag which is handled by trusted code, such as a microkernel within the processor, or a call to secure BIOS or operating system code. This general case permits use of the verification as a means to prevent execution of untrusted or malicious code. In other cases, the verification may be used as a means to identify a trust authority for code or a set of privileges, with the verification process used to implement restrictions, which need not be limited to execution per se. For example, a processor may have a set of secure registers, accessible only by code which verifies to a predetermined secure signature. Code which does not verify in accordance with the secure signature, may be blocked from the secure registers, and for example redirected to a different set of registers. A plurality of verification processes may be available, for example, with four different keys, permitting a verification and identification of processes, and contingent execution dependent on the verification.

According to a preferred embodiment, a cache line of instructions is fetched for execution by the processor, which itself is preferably a pipelined processor with a deep pipeline of greater than 5 stages. The processor may itself support parallel execution or parallel speculative execution, with multiple pipelines. As a cache line of instructions is available for processing, an encrypted signature (or set of signatures) putatively associated with the set of instructions is stored in the processor or fetched. Processing of the instructions is commenced, in advance of any result of a verification process. The reference signature is, in parallel with instruction execution, decrypted in the processor using a private key stored in secure memory. The signature of the cache line of instructions is calculated (or precalculated) and compared against the decrypted reference signature, to determine a verification. If the verification is successful, the execution of the instructions is committed, i.e., the results made available or changes in state made to registers. If the verification is unsuccessful, an exception is made, and for example, the instruction processing pipeline flushed before the instructions are committed. Other exception processing might include altering the processor to a "safe" state in which possibly malicious code is contained or prevented from altering other processes or memory, or triggering an operating system process to provide exception handling logic. Thus, the processor might be provided with an ability to handle verified code in a secure processing mode, and unverified code in an insecure or test processing mode.

An embodiment provides a system and method that validates that a program executing on a microprocessor is indeed the intended program. This validation is performed within the microprocessor, and while (concurrently with) the code is executing. In this case, it is possible to distinguish between different routines of verified code; that is, it is not sufficient that the code being executed is "verified"; it must be verified within the context of execution, for example by an operating system or by prior executed verified code. This prevents malicious use of verified code, and permits different levels of verification; an author or source verification, and a runtime verification. In some cases, a system may determine that certain instruction execution flows are incompatible or undesired, and therefore one instruction flow can permanently or temporarily revoke verification credentials for another instruction flow. As discussed above, the result of a failed verification need not be a bar to commitment of execution, and may result in a modification of execution. Thus, an incompatibility may arise because concurrent tasks seek to modify a common register. The verification arbitration may thus result in use of different and non-conflicting sets of registers.

A particular security risk is that programs can be modified by malicious code as they execute, for example in main memory or cache memory. A proposed mechanism detects such tampering as follows: As instructions that constitute the program are fetched into the lowest level cache, a signature Sg is generated for each of these cache lines within the microprocessor, based on techniques known to the art. For example, a hardware signature generator may be provided for the cache lines such that the signature is automatically generated without programmed processor intervention, for each such cache line. The expected signatures of the cache lines lines are pre-generated by a trusted authority, encrypted using a secret key S and stored in the RAM, along with the normal code. Therefore, in a typical case, the signatures will be created by a software author (in the case of a mass distributed private key), or by the operating system during a secure and trusted software installation process (in the case of a processor-specific private key). Of course, other options are possible for creating and using the expected signature Se, including hybrid schemes.

As instructions from the fetched line are decoded and executed, the encrypted expected signature of the cache line is fetched and decoded internally within the microprocessor using the secret key. This decoded expected signature Se is compared against the generated signature Sg and the result of the match is stored in a table within the microprocessor.

As instructions from the fetched line are committed (e.g., the instruction execution process is complete to the extent that changes to the processor or system state outside of the instruction processing pipeline are to be made), the stored result of comparing Sg and Se are consulted.

If the result indicates a match, instructions are committed normally.

If the result indicates a mismatch, further execution is halted and appropriate measures are invoked.

If, at the time of committing an instruction, a table entry exists but the results of the comparison are pending, instruction commitment may be held up momentarily.

If a matching entry does not exist at the time of commitment, the pipeline may be flushed, or other steps taken.

It is noted that it is also possible to include within the verification a partial execution result. That is, the verification is dependent on Se, Sg, and a processor register and/or pipeline state. In this way, security against both unverified instructions and certain types of data can be obtained. Of course, separate verification of data states and/or sequences may also be implemented.

Sg and Se need not be compared prior to processing the fetched instructions. This mitigates the delays in accessing the encoded expected signature Se and the delays of generating a new signature Sg and decoding the expected signature for comparison from affecting the microprocessor's instruction processing rate.

Assuming that code is executed in an expected manner, it is possible to predictively call Se, and begin decoding, in order to avoid delay. A set of Se may be cached in the processor, in volatile or non-volatile memory. Thus, a preferred embodiment provides that instruction verification and execution can concurrently occur, but that this need not be the case in all circumstances.

This scheme can be used for a number of purposes, including:

1. Detection of malicious attempts to modify code.
2. Ensure that only certified code can run and provides detection at run-time tampering of such code.
3. Permit trustworthy code to be distributed and used.
4. Detect instruction corruption due to faults—permanent or transient.
5. Execute instructions with results dependent on a signature verification.

Likewise, the present scheme can also serve the various purposes known for other secure processing platforms, and may generally be used in conjunction with other known security technologies. Thus, the present verification process is generally transparent to existing system architectures and execution paradigms, with the exception that the expected signatures must be available at runtime, and the small amount of overhead for calling the expected signatures and any delays from the verification process are tolerable. Since most modern computing platforms employing multilevel instruction cache and deep pipelines are non-deterministic, the expected overhead from the present verification processes, about 2% of processing capacity, is generally tolerable, and indeed, since the signature verification logic is somewhat functionally overlapping with error detection logic, in some cases the overhead may be abated. Likewise, verified code may avoid certain software implemented runtime tests. The processor itself is generally modified, for example to include hardware signature generation in the cache, hardware for verifying the instruction Sg against the expected signature Se, verification result processing (e.g., the table of verification results, contingent processing logic) and secure storage for the private key (or hardware for receipt of the private key). This amounts to less than about 20% die overhead, with the bulk of the excess consumed in cache line signature generation.

This technology is easy to retrofit to current designs, in feasible implementations would show little performance loss, and can use existing TPM support to implement processor-internal storage for secret keys. The design provides concurrent commencement of instruction execution and verification of code. A processor according to the present invention can result from modification of an existing design, which is compatible with pre-existing code, including well written code which runs in real-time, near real-time, or in time critical fashion. That is, the increased processing to verify the code signature against the expected code signature is, for the most part, an inherently parallel processing path which does not significantly increase processing latency.

A preferred embodiment of the invention employs a set-associative structure called a Cache line Signature Table (CST), to hold the entry for a lowest level cache line that was fetched on a level 1 instruction cache (L1 I-cache) miss. The entry may hold, for example, either the decrypted signature fetched from random access memory (RAM) or the generated signature, whatever is available earlier.

A signature is generated for each line by simply generating a digest function D on smaller chunks of each such line, for example at 16-bit or 32-bit boundaries.

In the event of a verification failure or signature mismatch, a rollback to a previous checkpoint may be implemented. Typically, this will be a desired result if the signatures are used for detecting software errors, or for secure control systems which are relatively intolerant of unavailability. On the other hand, in systems where a continued execution or attempted continuation after a fault is not required, or is undesired, an exception may be triggered, to address the mismatch, or even take countermeasures against a presumed attack. These countermeasures may be directed from code stored within the processor, and thus presumed secure, or from outside, in which case heightened scrutiny may be implemented.

According to one embodiment, a plurality of private keys may be stored within the processor, representing different stages of security. If a "first line" key becomes compromised, the processor may revoke that key, and thereafter employ and rely on a different key, which may have a greater key length or rely on a different algorithm. The presumption of security compromise may come from a certificate revocation list, or behavioral analysis of software with respect to prohibited functionality and/or malicious activity.

In like manner, in some embodiments, it may be possible to add a new certificate to the processor memory, which may exploit a hardware lock (presuming that malicious attacks are by software only), or using an authenticated key transfer technique. Note that if the keys are changed, any signatures created whose verification is dependent on the key will be invalid, and will have to be resupplied or recalculated.

According to one embodiment, the system is responsive to codes, e.g., program instructions or other signals, to deactivate some or all of the security features, and thereby allow exceptions to the normal prohibitions and control mechanisms. Preferably, these codes are provided by the operating system or some other trusted entity, in order to provide authentication of the exception. For example, during normal booting of an operating system, files may be modified, and this exception mechanism permits such modifications. After the operating system has completed these modifications, the security features may be re-enabled. According to another embodiment, multiple alternate authentication mechanisms are provided, which are selectively applied under control of authenticated processes and instructions. Therefore, the system may employ multiple parallel or alternate instruction authentication schemes, and optionally operate for periods without an instruction authentication processes active.

It is therefore an object of the invention to provide a processor comprising: a cache memory, configured to store instructions; an instruction processing pipeline, configured to receive a stored instruction from the cache memory for processing, having a pipeline latency between commencement of instruction processing and commitment of execution of the instruction; a cache memory signature generator, configured to generate a distinctive signature of at least one cache line stored in the cache memory; a memory configured to store an encrypted reference signature corresponding to the at least one cache line stored in the cache memory; a secure storage location configured to store a key adapted to decrypt the encrypted reference signature; decryption logic configured to decrypt the encrypted reference signature in dependence on the stored key; verification logic configured to verify the decrypted reference signature against the generated distinctive signature; and authorization logic configured to selectively permit the instruction processing pipeline to contingently proceed with processing of the instruction to a stage prior to commitment, in dependence on an output of the verification logic, and only if the generated distinctive signature is verified against the reference signature, authorizing commitment of the instruction from the cache line.

It is also an object of the invention to provide a processing method, comprising: receiving a stored instruction from a cache line in a cache memory for processing into an instruction processing pipeline, having a pipeline latency between commencement of instruction processing and commitment of execution of the instruction; generating a distinctive signature of the cache line; storing an encrypted reference signature corresponding to the cache line; securely storing a key adapted to decrypt the encrypted reference signature; decrypting the encrypted reference signature in dependence on the stored key; verifying the decrypted reference signature against the generated distinctive signature; and initiating processing of an instruction, and thereafter selectively permitting the instruction processing pipeline to contingently proceed to a stage prior to commitment, in dependence on the verifying, and only if the generated distinctive signature is verified against the reference signature, authorizing commitment of the instruction from the cache line.

It is a further object of the invention to provide a system and method in which a processor commences processing of an instruction in an instruction processing pipeline and proceeds to a stage before commitment of execution, wherein the commitment of execution is contingent on a verification of a cache line that includes the instruction by a verification process that proceeds concurrently with the instruction processing, in which a unique or distinctive signature is generated for the cache line, and compared against a reference signature which is received by the processor in encrypted form, and decrypted using a secret key stored in the processor, such that the instruction processing proceeds to commitment of execution if and only if the decrypted reference signature matches the generated signature of the cache line. The verification is available for all instructions in the same cache line, reducing potential delays. The processor preferably includes hardware enhancements such that the minimum time to decrypt an encrypted reference signature stored in the cache and verify it against the generated signature is less than the minimum time for commitment of execution of an instruction. Likewise, the cache line signatures are also preferably generated by specially provided hardware in the processor. Thus, if the reference signatures are available in cache memory, a verification latency beyond the normal pipeline processing latency is avoided. If the verification is not available in time, the pipeline may be stalled. If the verification fails, various embodiments provide that the processor may revert to a state defined by a known good checkpoint, or execute a secure exception process.

The cache memory signature generator may generate a distinctive signature of at least one instruction stored in the cache memory during the pipeline latency.

The memory may be configured to store an encrypted reference signature corresponding to the at least one instruction stored in the cache memory, receives the encrypted reference signature before the commitment of the said instruction.

The decryption logic may decrypt the encrypted reference signature during a period prior to at least one of decode, dispatch, or issue of the instruction.

The authorization logic may be configured to selectively permit the instruction processing pipeline to contingently proceed in dependence on an output of the verification logic.

The verification logic may verify the decrypted reference signature against the generated distinctive signature prior to the commitment of the instruction.

An instruction is preferably allowed to commence advancement through the instruction processing pipeline before the generated distinctive signature of a cache line that contained the instruction is verified against a reference signature of the cache line.

An instruction may be advanced through the instruction processing pipeline to a stage immediately prior to at least one of a decoding, a dispatch, and a commitment, and thereafter contingently processed in dependence on the verification logic.

The verification may be optionally disabled, to selectively permit processing of instructions for which the signature does not, or is not expected to, match.

The instruction processing pipeline may be configured to selectively commit execution of an instruction independent of the output of the verification logic, and subject to alternate instruction authentication logic.

The processor may comprise an integrated circuit.

The secure storage location may be on a common integrated circuit with at least the instruction processing pipeline. The secure storage location may also be on a different integrated circuit from at least the decryption logic, the system further comprising logic configured to securely communicate information corresponding to the key to the decryption logic.

The authorization logic may selectively permit the instruction processing pipeline to contingently proceed only if the decrypted reference signature exactly matches the generated distinctive signature.

The authorization logic may selectively control the instruction processing pipeline to provide at least two alternate results in dependence on the verification logic.

A table may be provided, configured to store a plurality of outputs of the verification logic for a plurality of different reference signatures.

The authorization logic may selectively suspend (e.g., stall) processing of an instruction in the instruction pipeline, prior to contingently proceeding, in dependence on an output of the verification logic.

The processor may further comprise decryption logic configured to decrypt instructions stored in the cache memory.

The processor may further comprise: a second memory configured to store a second encrypted reference signature corresponding to at least one second instruction stored in the cache memory; and second verification logic configured to verify a decrypted second encrypted reference signature against a generated distinctive signature of the at least one second instruction stored in the cache memory, wherein the verification logic and the second verification logic are concurrently operative to verify a generated distinctive signature against a reference signature.

The processor may further comprise an interface configured to receive at least the instructions and the encrypted reference signature from a memory external to the processor.

The authorization logic may be configured to initiate processing of an instruction, and to thereafter selectively permit the instruction processing pipeline to contingently proceed in dependence on an output of the verification logic.

The processor may comprise a memory representing a defined state, and wherein in dependence on an output of the verification logic, the processor may assume the defined state, without completing execution of the instruction. That is, if the processing of the instruction does not lead to commitment of execution, the processor may revert to a checkpoint or other state not selectively dependent on the content of the instruction, to thereby block malicious or corrupted instructions from executing or controlling the processor.

If the verification logic indicates a failure of verification of the decrypted reference signature against the generated distinctive signature, the processor may roll back to a predefined checkpoint state. The processor or memory may therefore sequentially store, using hardware or software, a checkpoint or known good (verified) state. This is particularly useful to assist in correction of instruction corruption events. The checkpoint state may be defined by hardware or software logic. In the case of software, preferably the checkpoint state is defined by instruction codes whose execution has been previously verified.

The cache memory signature generator may compute a distinctive digest function of at least a portion of a cache line, a signature in dependence on a cache line virtual address and a cache line content, a distinctive signature in which an incremental change in cache line content results in a non-incremental change in the generated distinctive signature, and/or a distinctive signature in dependence on a memory content and a memory virtual address, wherein generated distinctive signatures for memory locations having identical content at sequential virtual addresses results in an a difficult to predict change in the generated distinctive signature, and wherein the generated distinctive signature has a digital size smaller than a size of the cache line from which it is derived.

The instruction processing pipeline may comprise branch prediction logic and speculative processing logic, wherein the verification logic generates a signal corresponding to a branch misprediction with a rollback to a processor state prior to commencement of processing of an instruction whose verification failed.

The instruction processing pipeline may contingently proceed in dependence on the verifying, and may support an instruction processing pipeline stall if the verifying is delayed.

The decrypting and verifying are preferably capable of completing faster that the pipeline latency.

The verifying may determine an exact match between the generated distinctive signature and the decrypted reference signature. In some cases, a mask may be applied to permit verification of portions of a cache line, while permitting runtime variation or data-dependent instructions to be verified.

The system may also be used to generate execution flow control, in which a plurality of verifications may be employed, and the processor executes in accordance with a respective verification. A plurality of verifications may proceed concurrently. A plurality of verification results may be stored in a table for a plurality of different instructions.

In event of a failure of verification, the instruction processing pipeline may be flushed, and subsequent commitment of execution of the instruction preempted.

The distinctive signature may be a cryptographic digest of the cache line, in which it is statistically unlikely that two different cache lines assume the same signature, and wherein there is low predictability, absent a secret key, on what signature might correspond with a particular cache line content. Thus, a secret key is required to generate the cryptographic digest of the cache line, and a corresponding secret key is required to decrypt the reference signatures for comparison with the generated signatures.

The hardware for implementing the processor enhancements preferably makes use of processor instruction processing pipeline logic found in modern processors, with respect to branch prediction, speculative processing, and pipeline flushing, and thus preferably does not require substantial redesign of existing processor pipelines. On the other hand, in order to avoid, to the extent reasonable, added processing latency, assistive hardware which executes concurrently with the instruction processing pipeline is provided to calculate a cache line signature, decrypt the reference signature, and determine a correspondence thereof. Further supplemental hardware might include a table for storing the verification results, a content associative memory, and fetch logic to call reference signatures as or before needed, possibly in a speculative manner.

It is a further object to provide a processor system comprising a cache line signature generator, configured to generate a dynamic signature for a cache line of an instruction cache; verification logic configured to securely verify a reference signature for a respective cache line content against the dynamic signature; and an instruction processing pipeline having a plurality of sequential stages, configured to load an instruction from the cache line, speculatively execute the instruction in the plurality of stages prior to commitment, and selectively flush the pipeline in dependence on a signal prior to instruction commitment or permit instruction commitment, in dependence on a signal from the verification logic.

It is also an object to provide a processor comprising: an instruction processing pipeline, having at least one pipeline phase between receipt of an instruction for processing and commitment of the instruction, being responsive to at least one control flow instruction; a signature generator, configured to generate a signature of at least one instruction cache line storing at least one instruction; a secure storage location configured to store a key adapted to decrypt an encrypted reference signature for the at least one instruction; verification logic configured to verify a decrypted reference signature against the signature; and authentication logic configured to permit commitment of the at least one instruction, selectively based on a signal from the verification logic.

Another object provides a processing method, comprising: generating a signature of at least one instruction cache line storing at least one instruction; storing a key adapted to decrypt an encrypted reference signature for the at least one instruction; verifying a decrypted reference signature against the signature; and selectively permit commitment of the at least one instruction in an instruction processing pipeline responsive to at least one control flow instruction and having a latency between receipt of an instruction for processing and commitment of the instruction, based on said verification.

The processor may further comprise a cache, having the cache line, configured to store instructions; the instruction processing pipeline being configured to receive a stored instruction from the cache for processing; a memory configured to store the encrypted reference signature corresponding to the at least one cache line stored; and decryption logic configured to decrypt the encrypted reference signature in dependence on the stored key, wherein the authorization logic is configured to selectively permit the instruction processing pipeline to contingently proceed with processing of the at least one instruction to a stage prior to commitment, in dependence on the signal from the verification logic, and only if the generated signature is successfully verified against the reference signature, authorizing commitment of the at least one instruction from the cache line.

The pipeline may have a latency between commencement of instruction processing and commitment of the instruction, and for at least one cache line content, the signature generator generates the signature of the at least one instruction in the cache line, the encrypted reference signature is decrypted, and the decrypted reference signature verified against the signature during the pipeline latency substantially without stalling the pipeline waiting for the signal from the verification logic. Logic may also be provided configured to, if the verification logic fails to communicate a signal indicating permitted commitment of the at least one instruction, generate a fail signal, flush the pipeline of the at least one instruction from the cache line, and prevent the at least one instruction in the pipeline from commitment. An instruction may be advanced through the instruction processing pipeline to a stage immediately prior to at least one of a decoding, a dispatch, and a commitment, and is thereafter contingently at least one of decoded, dispatched and committed, in dependence on the signal. The at least one instruction may have an execution which is dependent on associated data present in the cache line, and the signature is dependent on the at least one instruction but not the data. The authorization logic may selectively control the instruction processing pipeline to provide at least two alternate results of instruction commitment in dependence on the signal.

A table may be provided, configured to store a plurality of outputs of the verification logic for a plurality of different reference signatures.

A second memory may be provided, configured to store a second encrypted reference signature corresponding to at least one second instruction stored in the cache; and second verification logic provided configured to verify a decrypted second encrypted reference signature against a generated signature of the at least one second instruction stored in the cache, wherein the verification logic and the second verification logic are concurrently operative to verify the generated signature against the reference signature and the second generated reference signature against the second reference signature.

The processor may comprises a memory representing a defined state or checkpoint state, and wherein selectively in dependence on the signal indicating a no permission for commitment of the at least one instruction, the processor may assume the defined state or rolls back to the checkpoint state, and does not complete execution of the instruction.

The signature generator preferably computes a distinctive digest function of the cache line. Preferably, the signature generator selectively generates the signature in dependence on at least a cache line virtual address and a cache line content. The signature generator may also produce a signature in which an incremental change in a cache line content results in a non-incremental change in the generated signature. The signature generator may produce a signature in dependence on at least a cache line memory location content and an associated virtual address, wherein generated signatures for memory locations having identical content at sequential virtual addresses are generated by a secret algorithm configured to result in an a difficult to predict change in the generated signature, and wherein the generated signature has a digital size smaller than a size of the cache line from which it is derived.

The instruction processing pipeline may include at least branch prediction logic and speculative processing logic. Advantageously, the effect of a failed verification can be similar to the effect of a branch misprediction or speculative processing failure, that is, the pipeline is flushed without completion of instruction processing, e.g., commitment of the instruction. Thus the signal corresponds to a branch misprediction, the processor being configured to initiate a rollback to a processor state prior to commencement of processing of an instruction whose verification failed.

According to one embodiment, a mode is provided wherein the instruction processing pipeline is configured to selectively commit an instruction independent of the output of the verification logic. That is, the particular security may be bypassed, for example during trusted startup procedures, system upgrades, and/or testing. The instruction processing pipeline may have a mode which selectively permits commitment of an instruction independent of a relation of the decrypted reference signature and the generated signature. Likewise, the instruction processing pipeline may be configured to selectively commit an instruction independent of the output of the verification logic, and subject to alternate instruction authentication logic.

The processor may be further configured to store a state of at least one of the verification logic and the authentication logic in a storage location when a context is switched out, and to restore the state of the at least one of the verification logic and the authentication logic from the storage location when the context is resumed.

According to another embodiment, the change in state effected by an instruction subject to verification may be outside of the instruction processing pipeline. For example, in a memory write operation, the data must be transferred to the memory before changing the state of the memory based on that data. Therefore, if the operation cannot be verified before the instruction which proposes the memory write is ready for commitment in the instruction processing pipeline, the implementation of the authentication processes may be distributed from the processor core, and to memory operation processing logic. Thus, under such circumstances where a substantial, and perhaps disadvantageous permanent change in the system state does not occur formally at the time of commitment of the instruction in the instruction processing pipeline per se, then the signal may be targeted at the external logic rather than the pipeline. This permits fewer stalls in the pipeline, but may impose administrative burdens on extra-processor communications. Thus, the system may be configured to process at least one instruction to compute a proposed change in state of an external memory, and further comprise logic configured to signal a permitted change in the state of external memory selectively based on the signal from the verification logic.

The method may further comprise storing an encrypted reference signature corresponding to the cache line; decrypting the encrypted reference signature in dependence on the stored key; and initiating processing of an instruction from the cache line, and thereafter permitting the instruction processing pipeline to proceed to a stage prior to commitment, and only if the generated distinctive signature is verified against the reference signature, authorizing commitment of the instruction. For at least one cache line content, the generated signature of the at least one instruction may be generated, the encrypted reference signature decrypted, and the decrypted reference signature verified against the signature, during the pipeline latency substantially without stalling the pipeline waiting for the verification. Correspondingly, for at least one cache line content, the instruction processing pipeline may support an instruction processing pipeline stall if the verification is delayed.

The verification may permit commitment of the at least one instruction in the pipeline based on a partial match of the generated signature of the cache line with the decrypted reference signature. For example, a value in the cache line may be dynamically generated or updated during program execution, and the reference signature calculated and/or presented to be independent of the variable data component.

A second encrypted reference signature corresponding to at least one second instruction may be stored in the cache; and a decrypted second encrypted reference signature verified against a generated signature of the at least one second instruction stored in the cache memory, wherein the verifying of the instruction and the verifying of the second instruction proceed concurrently. For example, in a multicore processor, a plurality of pipelines may be present. Likewise, the values in a plurality of cache lines may be verified concurrently, for a single pipeline.

A predefined or checkpoint processor state may be stored in a memory, and the predefined processor state or the processor state rolled back to the prior checkpoint state, preempting completion of execution of the at least one instruction in the instruction processing pipeline, in dependence on a result of said verifying.

The cache line signature may be selectively generated in dependence on a cache line virtual address and a cache line content.

The instruction processing pipeline may comprises branch prediction logic and speculative processing logic, wherein the verifying generates a signal corresponding to a branch misprediction, resulting in a rollback to a state prior to commencement of processing of an instruction whose verification failed. Likewise, other synergies with existing processor technologies may be exploited. For example, the signature and verification process is a type of error detection, and therefore processor logic which implements error detection may be reduced to the extent redundant with the verification of cache line signatures against reference signatures.

The method may provide a mode in which the instruction processing pipeline selectively commits an instruction independent of the verifying. The instruction processing pipeline may selectively commits an instruction independent of the verifying, and subject to alternate instruction authentication.

A state of at least one of the verification logic and the authentication logic may be stored in a storage location when a context is switched out, and the state of the at least one of the verification logic and the authentication logic restored from the storage location when the context is resumed.

The instruction processing pipeline may process at least one instruction to compute a proposed change in state of an external memory, and selectively permit a change in the external memory based on the verification logic. Therefore, in the case of, for example, a memory write, the instruction processing pipeline may be virtually extended to encompass cooperative pipelines which also incur latencies prior to making a substantially persistent change to the system, thus avoiding a stalled pipeline in a microprocessor core.

BRIEF DESCRIPTION OF THE DRAWINGS

For a detailed description of exemplary embodiments of the invention, reference will be made to the accompanying drawings in which.

DETAILED DESCRIPTION OF THE PREFERRED EMBODIMENTS

Figure 1:
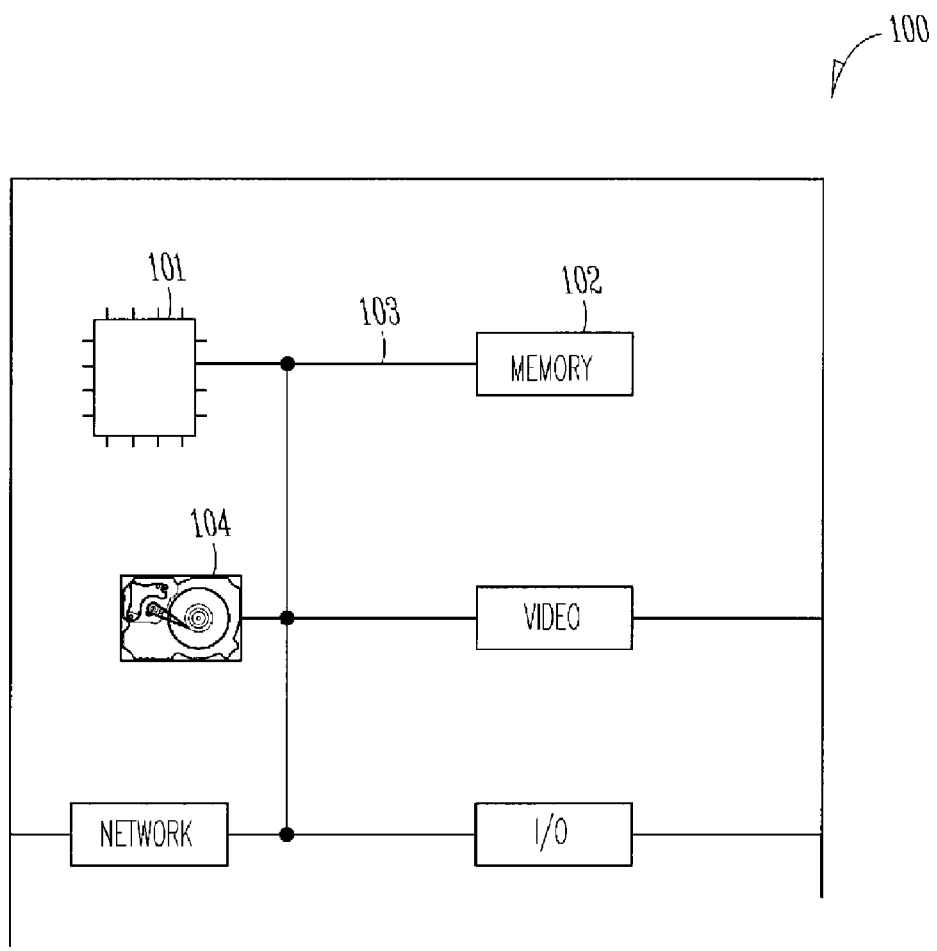
FIG. 1 illustrates a prior art network with a transmitter and a plurality of receivers.
Figure 2:
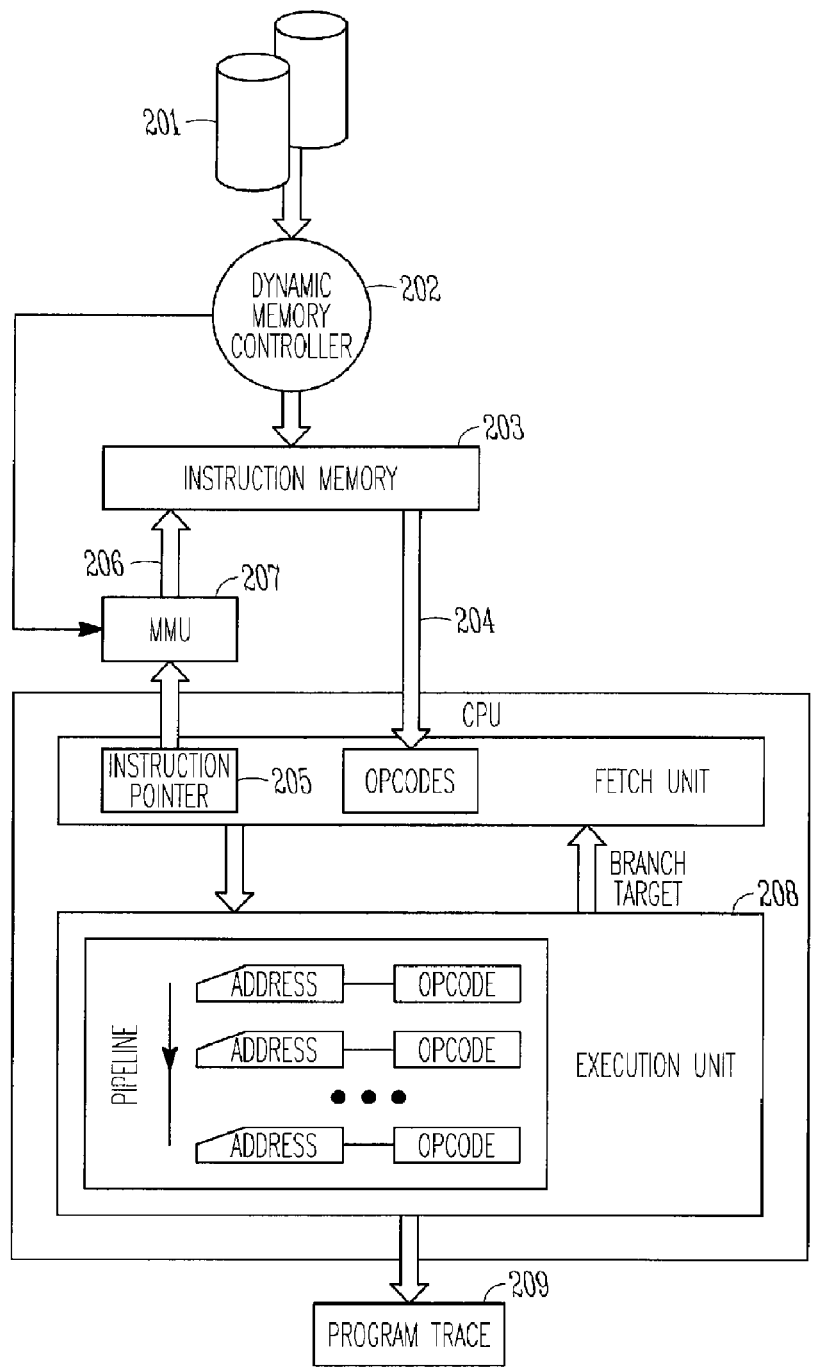
FIG. 2 illustrates a prior art device.
Figure 3:
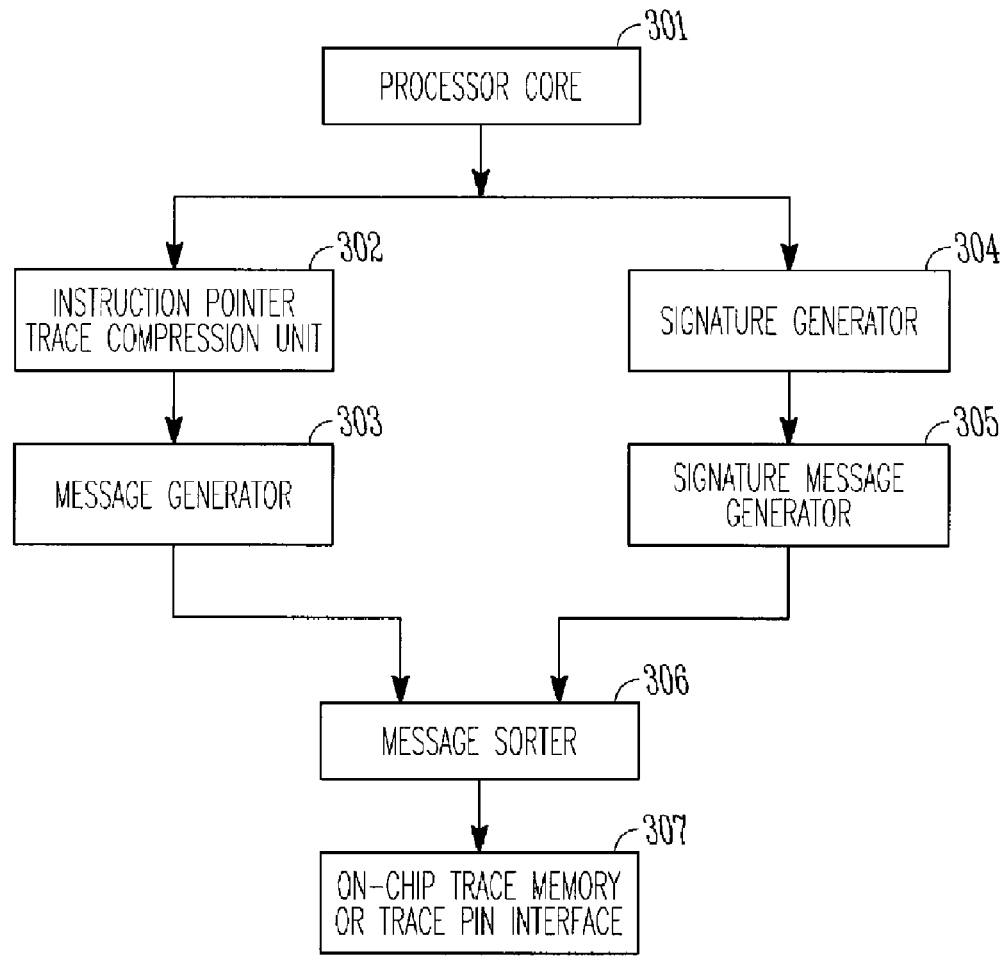
FIG. 3 illustrates is a block diagram of a processor comprising a signature generator and an instruction pointer trace unit of a prior art device.

A. Dynamic Authentication of Executions Using Cache Line Signatures

An approach for authenticating program execution dynamically is to detect if the binaries of the executables are compromised during the execution. One way to do this is to detect that the instructions that are fetched and executed, as the program is running, are indeed the same instructions that are supposed to be fetched and executed.

One way to do this is as follows:

The executable code is broken down into contiguous chunks at the boundaries of the cache lines (say, of size L) at the lowermost on-chip cache level. If necessary, padding can be used at the end of the code to round its size up to a multiple of the cache line size at the lowest level cache. A signature is generated for each such line by simply generating a digest function D on smaller chunks of each such line, for example at 16-bit or 32-bit boundaries. Thus, for each lowest level cache line's worth of code (say, Li), a specific signature (say Si, where Si=D (Li)) is generated for that line.

The signature Si for each line Li of the program's authentic binary is then encoded using a secret key and stored in a separate array. This secret key can be stored within the TPM storage or, alternatively, a secure storage for such keys can be constructed using the TPM module (which provides the root of trust).

As the program execution is started, on-chip cache misses are triggered in the course of fetching instructions. As each line holding the instruction that triggered the L1 I-cache miss is fetched into the lowest level cache, the corresponding encrypted signature is also retrieved. A digest for the line fetched, say Lf, is then generated by applying the digest function, D, that is Sf=D(Lf) is computed.

The encrypted signature of Lf is then decoded and compared with the computed signature Sf. If the decrypted signature matches Sf, then we conclude that the original binaries were not tampered with, and are thus deemed verified. If the computed signature and decrypted signatures mismatch, an exception can be triggered or actions similar to that taken with the control flow validation mechanism can be triggered. In reality, as described in the implementation details below, the validation of the contents of a line will be deferred until an instruction located within that line commits.

A.1 Assumptions

The security of this mechanism for authenticating a program execution at run-time makes the following implicit assumptions:

1. Once an instruction is fetched, it cannot be modified or replaced within the processor's caches.

2. The digest function D is sufficiently strong in generating a fairly unique signature for each lowest level cache line. Put in other words, two different cache lines, containing two different sets of instructions cannot accidentally have the same signature except in rare circumstances, and preferably in a highly unpredictable manner. One way to do this is to combine the line's virtual address with the cache line's contents in deriving the unique signature for that cache line, while taking into account the predictability of the cache line address—such as consecutive line addresses differ by one, higher order bits in a line address are going to be similar or close, etc.

3. If the contents of the cache lines are unaltered, control flow proceeds on expected paths.

4. There is a secure mechanism for storing the key used for decrypting the cache line signatures. The various existing TPM infrastructures provide this ability.

The performance overhead of the present mechanism is dependent on a number of things. First, hardware support is needed to compute the signature of a lowest level cache line as it is fetched. Using a simple one-time pad, where the one time key is XORed with the encrypted signature to decrypt it, can be a very efficient solution but the mechanism is open to all the vagaries of using a one-time pad. Alternative mechanisms, albeit with a higher overhead, can be employed. Any delay in decrypting the signatures can be avoided by fetching the signatures of a number of consecutive lower-level lines into the processor and decrypting them in advance, for example using a cryptographic or authentication coprocessor separate from the normal instruction processing flow of the main processor, but which may be integrated on the same chip. Second, the signatures have to be stored in a manner that permits them to be fetched quickly as the cache lines themselves are being fetched.

We now describe implementation details that takes into account the delays in both generating a signature from a line fetched into the lowest level cache as well as the delay involved in decrypting a precomputed encrypted signature for the cache line.

A.2 Implementation

Assume that the lowest level cache line size is B bytes and the digest to be computed over Q byte chunks of each such line, where B is an integer multiple of Q and the digest of a line is also Q bytes long. Assume further that the executable module is N bytes long, starting at virtual address A and, for the sake of simplicity, that N is an integer multiple of B. The number of encrypted digests that we need to store for the executable is thus $M=(N/B)*Q$. Assume that these encrypted digests are stored contiguously in the order of the line addresses, starting at virtual memory address Z. The virtual address of the encrypted digest for the memory line with the address X that is fetched into the lower level cache on a L1 I-cache miss is: $a=((X-A)/B)*Q+Z$. Thus, given the address of a line, the address of its encoded digest can be easily located.

Figure 4:
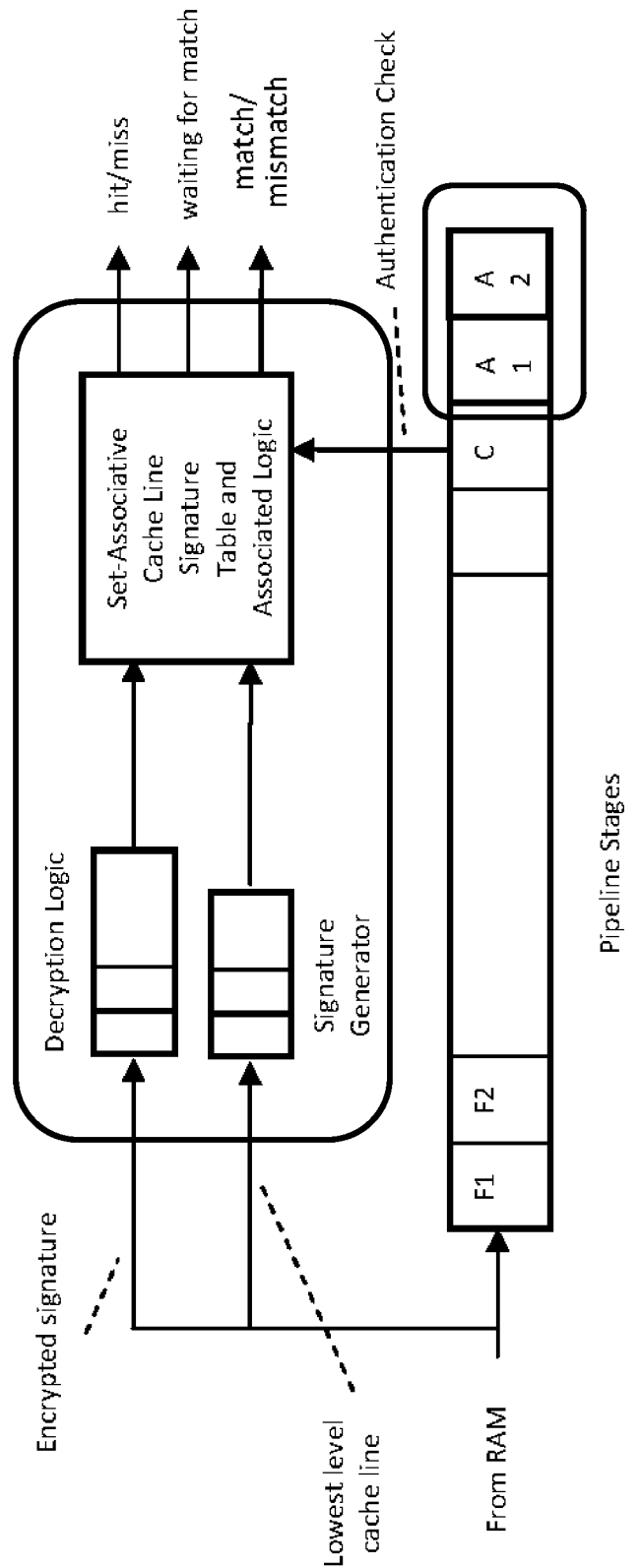
FIG. 4 illustrates a block diagram of an embodiment of the invention.

The cache based dynamic authentication mechanism is implemented as shown in FIG. 4. The implementation takes into account two constraints. First, it takes into account the fact that the both the generation of the signature of the fetched cache line and the decryption of the stored signature for comparison against the decrypted signature are potentially slow operations that take multiple pipeline cycles. Second, the signature of the line being fetched into the lowest level cache cannot be generated or generated and verified before that line is inserted into the cache and delivered to the fetch stage, as the time it takes to generate the signature or to fetch the encrypted signature from the signature table stored in the RAM and decrypt it for comparison against the signature generated of the fetched cache line will prolong the effective cache miss handling time and adversely impact the instruction fetch and decode rate.

According to an embodiment of the present technology, a set-associative structure called the Cache line Signature Table (CST) is used to hold the entry for a lowest level cache line that was fetched on a L1 I-cache miss. This entry holds either the decrypted signature fetched from the RAM or the generated signature, whatever is available earlier. Additionally, this entry holds status information that indicates:

(a) the status of the entry—allocated or de-allocated;
(b) what is currently held in the entry—a generated signature or a decrypted signature;
(c) if the stored entity is a generated signature (or a decrypted signature) was compared against the decrypted signature (or a generated signature); and
(d) the outcome of a match comparing the generated signature against a stored signature.

These four states can be easily encoded using 2 bits. If the generated signature or the stored signatures are S bits long, each entry in the signature table is (S+2) bits wide.

When either a generated signature or a decrypted signature arrives at the CST, and if the other entity being compared (the decrypted signature or the generated signature, respectively) is not available in the CST entry (as seen from the status bits), the first entity targeting the CST entry is simply stored within the CST and the status bits updated appropriately. Otherwise, the comparison of the decrypted and generated signatures can be performed, and the result of the match stored in the status field.

When an instruction is being committed, the signature table is probed to look for a matching entry. If a matching entry is found (CST hit), the instruction is committed as usual only if the matching entry indicates that the comparison of the decrypted signature and the stored signature was successful. If the signature comparison was performed and the generated signature did not match the decrypted signature, an exception is generated and the instruction is not committed. For all other conditions on a CST hit, the instruction commitment is held up, and this may result in a stall elsewhere in the pipeline. If at the time of committing an instruction, a CST miss occurred, the pipeline is flushed, treating the instruction being committed as a mispredicted branch. This is done to ensure that instructions from a lowest level cache whose signature may have been potentially unverified cannot be committed.

Two additional pipeline stages (labeled A1 and A2) are added at the tail end of the pipeline, following the last pipeline stage that handles commitment (labeled C) to handle the CST lookup and associated activities described above. The normal commitment is delayed until the instructions are exiting from A2. Additional stages may be added if the CST lookup and activities require more than two cycles. These added stages, obviously, do not affect the instruction pipeline commitment stage in any way as they follow the stages that would perform commitment in a normal pipeline. On a miss at the lowest on-chip cache level that was triggered by a L1 I-cache miss, the missing line is fetched and handled as usual to satisfy the L1 I-cache miss.

The following actions are then undertaken simultaneously:

The signature table is probed to locate any matching entry in the table. If a matching entry is not found, it is allocated and initialized and pinned down until either the generated signature or the decrypted signature is written to the CST entry. Note that in the worst case, if an entry cannot be allocated in the CST on a lowest level cache miss, because all the ways in the matching set within the CST are pinned, the cache miss handling stalls. If a matching entry is found, three cases arise: if the matching entry indicates that a match was performed and it resulted in a mismatch, the entry is left untouched. This is done to ensure that uncommitted instructions from the cache line will trigger an exception at the time of commitment. If the CST entry indicates that a match occurred, it is marked as a pending match to ensure that instructions from the version of the lowest level cache line that will now be fetched are also authenticated properly. If the matching entry in the CST indicates a pending match, no further actions are taken until the missing cache line is fetched. At that time, the CST is probed again and if the CST entry is still found as match pending, instruction dispatching is stalled until the pipeline drains. After the pipeline has drained, the CST entry is completely reset and instruction issue resumes with other activities that corresponded to a CST miss. The pipeline draining step assures that that the proposed authentication scheme detects if the newly fetched version of the cache line was altered since it was last fetched and used. Another obvious way of altogether avoiding this corner case is to flush matching entries in the CST when corresponding lines are evicted from the lowest level cache, but this approach requires additional probes of the CST and takes a performance toll.

On setting up a new CST entry (or after marking an existing CST entry as match pending), the signature of the fetched cache line is generated immediately after fetching the line. A memory request to fetch the encrypted signature is generated. In general, memory requests for handling cache misses take a precedence over memory requests for fetching encrypted signatures, but queued up memory requests for fetching encrypted signatures are given precedence over normal memory requests periodically to avoid livelocks.

A.3 Extensions
A.3.1 Signature Generation etc:
The size of the signature, the generating function, etc. can be programmable. These can be generated by a trusted authority and appropriate header extensions can be added to the binary of the executed code to:

(a) convey location of encoded signature table;
(b) DLLs and their secret key (see below),
(c) other relevant info (will spell this out later).

A.3.2 Handling Dynamically Linked Libraries:
Each library has its own signature and perhaps a separate secret key for decoding. As a control flow occurs, information is provided to the code (or through the hardware) to locate the dedicated secret key for the library. This mechanism could also be implemented as a software trap on attempts to branch to DLLs.

A.3.3 Handling Computed Branches
The handling of computer branches works the generally same way as DLLs or branching within the same module. The signature of cache lines that contain the executed instructions can be verified.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

REFERENCES

Incorporated Herein by Reference

[1] SETI@home.setiathome.ssl.berkeley.edu/.
[2] TCPA.www.trustedcomputing.org/.
[3] A. Carroll, M. Juarez, J. Polk, and T. Leininger. Microsoft Palladium: A business overview, August 2002. Microsoft Press Release.
[4] B. Gassend, D. Clarke, M. Van Dijk, and S. Devadas. Controlled physical random functions. In *Proceedings of the 18th Annual Computer Security Applications Conference*, December 2002.
[5] D. Lie, C. A. Thekkath, M. Mitchell, P. Lincoln, D. Boneh, J. C. Mitchell, and M. Horowitz. Architectural support for copy and tamper resistant software. In *Proceedings of Conference on Architectural Support for Programming Languages and Operating Systems* (ASPLOS), pages 168-177, 2000.
[6] U. Maheshwari, R. Vingralek, and W. Shapiro. How to build a trusted database system on untrusted storage. In *Proceedings of the 4th USENIX Symposium on Operating Systems Design and Implementation*, pages 135-150, October 2000.
[7] S. W. Smith and S. H. Weingart. Building a high performance, programmable secure coprocessor. In *Computer Networks (Special Issue on Computer Network Security)*, volume 31, pages 831-860, April 1999.
[8] E. Suh, D. Clarke, B. Gassend, M. van Dijk, and S. Devadas. The AEGIS processor architecture for tamper evident and tamper resistant processing. Technical Report LCS-TM-461, Massachusetts Institute of Technology, February 2003.
[9] E. Suh, D. Clarke, B. Gassend, M. van Dijk, and S. Devadas. Hardware mechanisms for memory authentication. Technical Report LCS-TM-460, Massachusetts Institute of Technology, February 2003.
[10] S. Weingart. Physical security for the µABYSS system. In *Proceedings of the IEEE Computer Society Conference on Security and Privacy*, pages 38-51, 1987.
[11] S. White, S. Weingart, W. Arnold, and E. Palmer. Introduction to the Citadel architecture: security in physically exposed environments. Technical Report RC16672, IBM Thomas J. Watson Research Center, March 1991.
[12] B. Yee. *Using secure coprocessors*. PhD thesis, Carnegie Mellon University, May 1994.

The invention claimed is:

1. A microprocessor comprising:
an instruction processing pipeline, having at least one pipeline phase between receipt of an instruction for processing and commitment of the instruction, being responsive to at least one control flow instruction;
signature generator elements configured to generate a signature of at least one instruction cache line storing at least one instruction;
a secure storage location configured to store key information adapted to decrypt an encrypted reference signature for the at least one instruction;
verification logic elements configured to verify a decrypted reference signature against the signature; and
authentication logic elements configured to permit commitment of the at least one instruction loaded within the instruction processing pipeline, and to generate an exception and prevent commitment of the at least one instruction within the instruction processing pipeline, selectively based on a signal from the verification logic elements.

2. The microprocessor according to claim 1, further comprising:
a cache, having the cache line, configured to store instructions;
the instruction processing pipeline being configured to receive a stored instruction from the cache for processing;
a memory configured to store the encrypted reference signature corresponding to the at least one cache line stored; and
decryption logic elements configured to decrypt the encrypted reference signature in dependence on the stored key, wherein the authentication logic elements are configured to selectively permit the instruction processing pipeline to contingently proceed with processing of the at least one instruction to a stage prior to commitment, in dependence on the signal from the verification logic elements, and only if the generated signature is successfully verified against the reference signature, authorizing commitment of the at least one instruction from the cache line.

3. The microprocessor according to claim 1, wherein the pipeline has a latency between commencement of instruction processing and commitment of the instruction, and for at least one cache line content, the signature generator comprising logical elements that generate the signature of the at least one instruction in the cache line, the encrypted reference signature is decrypted, and the decrypted reference signature verified against the signature during the pipeline latency without stalling the pipeline waiting for the signal from the verification logic elements.

4. The microprocessor according to claim 1, wherein the pipeline has a latency between commencement of instruction processing and commitment of the instruction during which the instruction is decoded and prepared for commitment, further comprising logical elements configured to, if the verification logic elements fail to communicate a signal indicating permitted commitment of the at least one instruction, generate a fail signal, flush the pipeline of the at least one instruction from the cache line, and prevent the at least one instruction in the pipeline from commitment.

5. The microprocessor according to claim 1, wherein an instruction is advanced through the instruction processing pipeline to a stage immediately prior to at least one of a decoding, a dispatch, and a commitment, and is thereafter contingently at least one of decoded, dispatched and committed, in dependence on the signal.

6. The microprocessor according to claim 1, wherein the at least one instruction has an execution which is dependent on associated data present in the cache line, and the signature is dependent on the at least one instruction but not the data.

7. The microprocessor according to claim 1, wherein the authentication logic elements selectively control the instruction processing pipeline to provide at least two alternate results of instruction commitment in dependence on the signal.

8. The microprocessor according to claim 1, further comprising a table configured to store a plurality of outputs of the verification logic elements for a plurality of different reference signatures.

9. The microprocessor according to claim 2, further comprising:
a second memory configured to store a second encrypted reference signature corresponding to at least one second instruction stored in the cache; and
second verification logic elements configured to verify a decrypted second encrypted reference signature against a generated signature of the at least one second instruction stored in the cache, wherein the verification logic elements and the second verification logic elements are concurrently operative to verify the generated signature against the reference signature and the second generated reference signature against the second reference signature.

10. The microprocessor according to claim 1, wherein the microprocessor comprises a memory representing a defined state, and wherein selectively in dependence on the signal indicating a no permission for commitment of the at least one instruction, the microprocessor assumes the defined state, and does not complete execution of the instruction.

11. The microprocessor according to claim 10, wherein the defined state comprises a checkpoint state, wherein if the verification logic elements indicate a failure of verification of the decrypted reference signature against the generated signature, the microprocessor rolls back to the defined checkpoint state.

12. The microprocessor according to claim 1, wherein the signature generator comprising logical elements compute a distinctive digest function of the cache line.

13. The microprocessor according to claim 1, wherein the signature generator comprises logical elements that selectively generate the signature in dependence on at least a cache line virtual address and a cache line content.

14. The microprocessor according to claim 1, wherein the signature generator comprising logical elements produce a signature in which an incremental change in a cache line content results in a non-incremental change in the generated signature.

15. The microprocessor according to claim 1, wherein the signature generator comprising logical elements produce a signature in dependence on at least a cache line memory location content and an associated virtual address, wherein generated signatures for memory locations having identical content at sequential virtual addresses are generated by a secret algorithm executed on logical elements configured to result in an a difficult to predict change in the generated signature, and wherein the generated signature has a digital size smaller than a size of the cache line from which it is derived.

16. The microprocessor according to claim 1, wherein the instruction processing pipeline comprises at least branch prediction logic elements and speculative processing logic elements, wherein the signal corresponds to a branch misprediction, the microprocessor being configured to initiate a rollback to a microprocessor state prior to commencement of processing of an instruction whose verification failed.

17. The microprocessor according to claim 1, wherein the instruction processing pipeline is configured to selectively commit an instruction independent of the output of the verification logic elements.

18. The microprocessor according to claim 1, wherein the instruction processing pipeline is configured to selectively commit an instruction independent of the output of the verification logic elements, and subject to alternate instruction authentication logic elements.

19. The microprocessor according to claim 1, wherein the instruction processing pipeline has a mode which selectively permits commitment of an instruction independent of a relation of the decrypted reference signature and the generated signature.

20. The microprocessor according to claim 1, being further configured to store a state of at least one of the verification logic elements and the authentication logic elements in a storage location when a context is switched out, and to restore the state of the at least one of the verification logic elements and the authentication logic elements from the storage location when the context is resumed.

21. The microprocessor according to claim 1, wherein the instruction processing pipeline is configured to process at least one instruction to compute a proposed change in state of an external memory, further comprising logic elements configured to signal a permitted change in the state of external memory selectively based on the signal from the verification logic elements.

22. A processing method, comprising:
generating a signature of at least one instruction cache line storing at least one instruction;
storing a key adapted to decrypt an encrypted reference signature for the at least one instruction; verifying a decrypted reference signature against the signature while the at least one instruction is in an instruction processing pipeline of a microprocessor; and selectively permitting commitment of the at least one instruction in the instruction processing pipeline of the microprocessor responsive to at least one control flow instruction based on said verifying, the instruction processing pipeline of the microprocessor having a latency between receipt of an instruction for processing and commitment of the instruction greater than a latency of said verifying.

23. The method according to claim 22, further comprising:
storing an encrypted reference signature corresponding to the cache line;
decrypting the encrypted reference signature in dependence on the stored key; and
initiating processing of an instruction from the cache line, and thereafter permitting the instruction processing pipeline to proceed to a stage prior to commitment, and only if the generated distinctive signature is verified against the reference signature, authorizing commitment of the instruction.

24. The method according to claim 22, wherein for at least one cache line content, the generated signature of the at least one instruction is generated, the encrypted reference signature is decrypted, and the decrypted reference signature is verified against the signature, during the pipeline latency without stalling the pipeline waiting for the verification.

25. The method according to claim 24, wherein for at least one cache line content, the instruction processing pipeline supports an instruction processing pipeline stall if the verification is delayed.

26. The method according to claim 22, wherein the verification permits commitment of the at least one instruction in the pipeline based on a partial match of the generated signature of the cache line with the decrypted reference signature.

27. The method according to claim 22, further comprising:
storing a second encrypted reference signature corresponding to at least one second instruction stored in the cache; and verifying a decrypted second encrypted reference signature against a generated signature of the at least one second instruction stored in the cache memory, wherein the verifying of the instruction and the verifying of the second instruction proceed concurrently.

28. The method according to claim 22, further comprising storing a defined microprocessor state, and selectively assuming the defined microprocessor state, and preempting completion of execution of the at least one instruction in the instruction processing pipeline, in dependence on a result of said verifying.

29. The method according to claim 22, further comprising, if said verifying fails to verify the decrypted reference signature against the generated signature, rolling back the microprocessor state to a predefined checkpoint state.

30. The method according to claim 22, wherein the signature is selectively generated in dependence on a cache line virtual address and a cache line content.

31. The method according to claim 22, wherein the instruction processing pipeline comprises branch prediction logic elements and speculative processing logic elements, wherein the verifying generates a signal corresponding to a branch misprediction, resulting in a rollback to a state prior to commencement of processing of an instruction whose verification failed.

32. The method according to claim 22, further comprising providing a mode in which the instruction processing pipeline selectively commits an instruction independent of the verifying.

33. The method according to claim 32, wherein the instruction processing pipeline selectively commits an instruction independent of the verifying, and subject to alternate instruction authentication.

34. The method according to claim 22, further comprising storing a state of at least one of the verification logic elements and the authentication logic elements in a storage location when a context is switched out, and restoring the state of the at least one of the verification logic elements and the authentication logic elements from the storage location when the context is resumed.

35. The method according to claim 22, wherein the instruction processing pipeline processes at least one instruction to compute a proposed change in state of an external memory, and selectively permitting a change in the a of external memory based on the verification logic elements.

* * * * *